US006183709B1

(12) United States Patent
Stephenson et al.

(10) Patent No.: US 6,183,709 B1
(45) Date of Patent: Feb. 6, 2001

(54) PROCESS FOR SEPARATION OF OXYGEN FROM AN OXYGEN CONTAINING GAS USING OXYGEN SELECTIVE SORBENTS

(75) Inventors: Neil Andrew Stephenson; Paula Marie Chinn Stephenson, both of East Amherst, NY (US)

(73) Assignee: Praxair Technology, Inc., Danbury, CT (US)

( * ) Notice: Under 35 U.S.C. 154(b), the term of this patent shall be extended for 0 days.

(21) Appl. No.: 09/225,052

(22) Filed: Jan. 4, 1999

Related U.S. Application Data

(63) Continuation of application No. 08/784,175, filed on Jan. 15, 1997, now abandoned.

(51) Int. Cl.[7] .............................. C01B 13/02; C07F 9/00; C07F 7/00
(52) U.S. Cl. ...................... 423/213.2; 423/219; 540/145; 556/32
(58) Field of Search ................................ 423/219, 213.2; 540/145; 556/32

(56) References Cited

U.S. PATENT DOCUMENTS

| 4,451,270 | 5/1984 | Roman ..................................... 55/38 |
| 5,266,283 | 11/1993 | Friesen et al. ....................... 423/219 |

OTHER PUBLICATIONS

F. Wiseman, B. Krebs, "Molekulstruktur and intermolekulare Koordination von acylsubstituierten Chelatkomplexen Schiffscher Basen"*Z. anorg. allg. Chem.* 621 (1995) 1883–1892

Schaefer et al, "Oxygen–Carrying Cobalt Complexes. Structures of N. N.Δ–Ethylenebis (3–tert–butylsalicylidenimina-to)cobalt(ll) and its Monomeric Dioxygen Adduct[1]",*Inorg. Chem1989,* 19, 340, 344.

Leal et al, "Reversible Adsorbtion of Oxygen on Silica Gel Modified by Imidazole–Attached Iron Tetraphenylporphyrin", *Northwestern University, Evanston, Illinois 60201,* Dec. 1974.

Dr. Neil H. Hendricks, "Separation of Gases Via Novel Transition Metal Complexes",Report No. NSF/IS187101, Aug. 21, 1987.

*Primary Examiner*—John M. Ford
*Assistant Examiner*—Pavanaram K Sripada
(74) *Attorney, Agent, or Firm*—Robert J. Follett

(57) ABSTRACT

The invention is directed to a process for the separation of oxygen from an oxygen containing gas using an oxygen selective material comprising a transition element complex comprising a first transition element ion and one or more chelating ligands, wherein:

i) said first transition element ion is capable of accepting intermolecular donation;

ii) said chelating ligand or ligands provides up to four intramolecular donor sites to said transition element ion;

iii) said chelating ligand or ligands provides an intermolecular donor site to a second transition element ion which is contained in second discrete transition element complex; and iv) said chelating ligand or ligands contains at least one substituent that inhibits μ-peroxo dimer formation on said sorbent;

wherein when said material is in deoxy form, the total number of donor sites to said first transition element ion is five.

17 Claims, 5 Drawing Sheets

PROCESS FOR SEPARATION OF OXYGEN FROM AN OXYGEN CONTAINING GAS USING OXYGEN SELECTIVE SORBENTS

This application is a continuation of Ser. No. 08/784,175 filed Jan. 15, 1997 now abandoned.

This invention was made with United States government support under Cooperative Agreement No. 70NANB5H1083 awarded by the Department of Commerce National Institute of Standards and Technology. The United States government has certain rights in the invention.

FIELD OF THE INVENTION

The invention is directed to sorbents used for separating oxygen from mixtures containing other components. More particularly, the invention is directed to the use of transition element complexes (TECs) as oxygen selective sorbents.

BACKGROUND OF THE INVENTION

The separation and enrichment of air by the use of either rate or equilibrium selective sorbents has been practiced for some time. Nitrogen selective sorbents, as typified by ion-exchanged zeolites, are nitrogen selective at equilibrium and have been used in pressure swing adsorption (PSA) processes. Similarly, carbon molecular sieves (CMS) are used for air separation by PSA processes and rely on a rate selectivity for oxygen. Adsorbents that are oxygen selective at equilibrium are preferred for many applications since cycle times for PSA processes are not constrained as typically required for rate selective sorbents.

Transition element complexes (TECs) are one class of materials known to react reversibly at or below ambient temperatures without breaking the O=O double bond. The use of TECs to selectively remove oxygen from its mixtures with other gases has been disclosed for solutions of TECs, for solid-state TECs or slurries of said solids, for TECs supported physically on solid supports, for TECs incorporated in zeolites and for TECs bound chemically to physical supports. Each of the known approaches for the use of TECs have been beset by one or more of the following problems: (1) insufficient oxygen capacity, (2) slow reaction rates, (3) decreasing reactivity with time, and (4) a metal ion: oxygen binding ratio of 2:1 ($\mu$-peroxo). Due to these problems, none of such TEC systems has yet been employed in commercially acceptable embodiments for air separation or oxygen removal from gas stream applications.

Extensive literature reports exist describing the reversible oxygenation of TECs having tetradentate ligands, particularly in solution. These materials require an exogenous base (e.g. a molecule or ion, added as a separate component, with a site or sites capable of coordinating to the metal center by electron donation) such as pyridine. The use of an exogenous base is necessary for TECs based on tetradentate ligands in order to provide the five-coordinate deoxy TEC sites required for superoxo binding.

One class of TECs is referred to as "protected" TECs. These use ligand superstructures referred to as "caps", "picket-fences", and "bridges" to sterically inhibit m-peroxo binding and to provide a permanent void on one face of the TEC that serves as an oxygen interaction site. Examples of such ligand systems include porphyrins, cyclidenes, and Schiff bases. Unfortunately, the number, complexity, and yields of the synthetic steps required to make TECs based on these superstructured ligands results in costs that are prohibitively high for many applications. In addition, the high molecular weights inherent in superstructured TECs restrict the oxygen loadings and storages that are achievable. Finally, oxygen interaction rates are slow for known non-supported solid forms of protected TECs due to intracrystalline diffusion.

More recent reports disclose TECs having tetradentate ligands containing substituents capable of inhibiting $\mu$-peroxo dimer formation in solution, that can be prepared with relative ease and have relatively low molecular weights. The substituents in these systems are typically attached at a single-point. These materials require exogenous donors to provide five-coordinate deoxy TEC sites, and do not show sufficient oxygen uptake in the solid phase for commercial application.

Reversible oxygenation of TECs having pentadentate ligands in dilute solution is also known. These include examples having substituents that inhibit $\mu$-peroxo dimer formation, and where the ligand structure and donors are intramolecular. To date, none of the known materials have been found to react reversibly with oxygen in the solid state.

The preparation of coordination polymers based on discrete molecular TECs incorporating sites capable of intermolecular donation has also been described. To date, however, none of these examples have been found to react reversibly with oxygen in the solid state.

Solid state TECs offer several advantages over those in dilute solution as the latter materials have problems which have hampered commercial development such as solubility, solvent loss, viscosity, and TEC lifetime.

The ability of transition element centers in some solid state TECs to undergo a reversible interaction with oxygen is known, and the use of supports to disperse or distribute oxygen selective sites derived from discrete molecular TECs to form oxygen selective sorbents has been described. Unfortunately, the reported examples where TECs are dispersed on or within a support, within a polymer, or as an integral part of the polymer, contain insufficient oxygen selective sites for practical use. As an example, Basolo et al ("Reversible Adsorption of Oxygen on Silica gel Modified by Imidazole-Attached Iron Tetraphenylporphyrin", *J. Amer. Chem. Soc.*, 1975, 97, 5125–51) developed methods to attach iron porphyrins to silica gel supports via an axial donor. While these demonstrated a substantial improvement in stability relative to solution systems, the TEC content reported was less than 0.1 mol/kg.

Hendricks, in "Separation of Gases via Novel Transition Metal Complexes," Report Number NSF/ISI87101, Aug. 21, 1987 discloses attempted to prepare oxygen selective sorbents based on TECs by intermolecular donation using peripheral ligand sites.

However, it was concluded that the materials tested did not "rapidly and efficiently adsorb oxygen" and that this apparently was due to unfavorable molecular packing.

Another series of materials having oxygen selectivity at equilibrium includes cyanocobaltate materials such as lithium pentacyanocobaltate solvates. While gas separation processes which utilize these materials have been disclosed, ranges of composition are restricted, and an ability to optimize performance by adjusting isotherm shapes is limited.

OBJECTS OF THE INVENTION

It is therefore an object of the invention to provide for a TEC-based oxygen selective sorbent which reversibly binds oxygen, is easily synthesized and has structural versatility.

SUMMARY OF THE INVENTION

The invention comprises a sorbent material comprising a molecular transition element complex which contains a first transition element ion and one or more chelating ligands, wherein:

i) said chelating ligand or ligands provides up to four intramolecular donor sites to said transition element ion;

ii) said chelating ligand or ligands provides an intermolecular donor site to a second transition element ion which is contained in second discrete transition element complex; and iii) said chelating ligand or ligands contains at least one substituent that inhibits $\mu$-peroxo dimer formation on said complex;

wherein when said complex is in deoxy form, the total number of donor sites to said first transition element ion is five.

The invention is also directed to a method of making said sorbents, wherein said method comprises the following steps:

a) providing a chelating ligand or ligands (precursors to the above noted chelating ligand or ligands may also be used) that provide the following features:

i) said chelating ligand or ligands provides up to four intramolecular donor sites to a transition element ion;

ii) said chelating ligand or ligands provides an intermolecular donor site to a second transition element ion which is contained in second discrete transition element complex; and iii) said chelating ligand or ligands contains at least one substituent that inhibits $\mu$-peroxo dimer formation on said complex;

b) combining said ligand, ligands or precursors with a metal salt in solution so as to form a transition element complex;

c) isolating said transition element complex by at least one of filtration, concentration, precipitation such that said complex is recovered in the solid state.

Another embodiment comprises a process for selectively adsorbing oxygen from a gas mixture thereof which comprises contacting said gas mixture with a material comprising a molecular transition element complex which contains: a first transition element ion and one or more chelating ligands, wherein:

i) said chelating ligand or ligands provides up to four intramolecular donor sites to said transition element ion;

ii) said chelating ligand or ligands provides an intermolecular donor site to a second transition element ion which is contained in second discrete transition element complex; and iii) said chelating ligand or ligands contains at least one substituent that inhibits $\mu$-peroxo dimer formation on said complex;

wherein when said complex is in deoxy form, the total number of donor sites to said first transition element ion is five.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

The present invention is directed to a new approach using TECs as oxygen selective sorbents. One important feature of the invention is that it involves intermolecular coordination between discrete TEC sites. This offers significant advantages over current materials with respect to structural versatility, equilibrium oxygen uptake, and other practical considerations for separation applications such as lifetime, isotherm tuning, and fast interaction rates.

In particular, the invention preferably comprises two features. In the first feature, discrete molecular TECs are provided wherein one or more chelating ligands provide up to four donors in an intramolecular sense to a central metal ion, said one or more chelating ligands provide a donor that binds intermolecularly to the metal ion associated with another TEC unit. In addition, said one or more ligands provide a substituent or substituents to inhibit $\mu$-peroxo dimer formation and ensure vacant oxygen interaction sites on a TEC.

Figure 1:
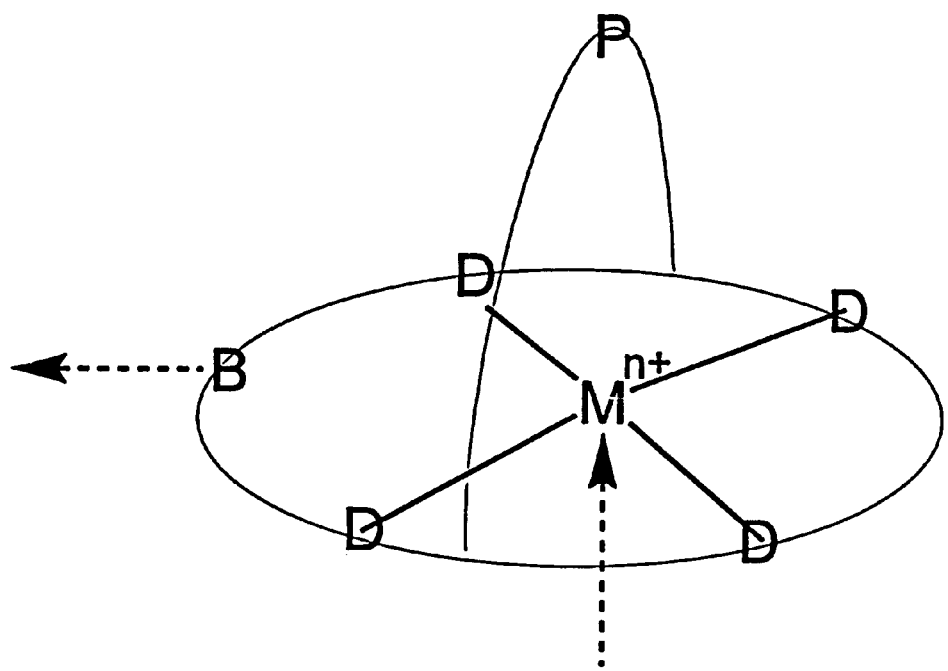
FIG. 1 is a schematic representation of a TEC according to one embodiment of the invention.

A schematic representation of these features is shown in FIG. 1. The ligand substituent or substituents that inhibits $\mu$-peroxo dimer formation and control or modify packing of TEC units to prevent blockage of oxygen interaction sites is designated P (shown schematically as a bridge, but not required to be a bridge).

Preferred ligand substituents that can fulfill the role of P include alkyl, aryl, O-alkyl, O-aryl, acyl, aroyl, alkyl and aryl esters, alkylamides, halogens, nitro, and nitrile groups. Specific examples include tert-butyl-substituents for TECs derived from Schiff base adducts of salicylaldehydes, and TECs which are formally based on Schiff base adducts of 2-aroyl-1,3-dicarbonyls. In some cases, a combination of the above groups is required so that interactions between them create conformers that provide P. For example, a methyl group adjacent to a ketone may force it to rotate out of plane. In addition, in some cases, the intermolecular packing may create structures where substituents on neighboring TECs serve to create vacant oxygen interaction sites in five coordinate deoxy TECs.

Sites designated D provide intramolecular donation to a central metal ion designated $M^{n+}$, and serve as the primary coordination sphere. They may be comprised of similar or dissimilar donor atom types. Donor sites D include nitrogen, oxygen, and sulfur atoms present in functional groups including amines, amides, imines, aldehydes, ketones, esters, acids, $\beta$-ketoimines, phenolates, alcohols, ethers, thiols, thioethers, thioesters, thioamides and various combinations thereof. Preferred examples are based on Schiff base ligands containing $N_2O_2$ donor sets. $M^{n+}$ ions that provide the oxygen interaction sites when combined with a suitable donor set are selected from transition elements including cobalt(II), iron(II), nickel(II), manganese(II), ruthenium(II), ruthenium(III), copper(I) and rhodium(III). Cobalt(II), iron (II), nickel(II) and copper(I) are preferred.

Group B serves as a donor that functions intermolecularly between discrete TECs. These are constrained to serve as axial donors in an intermolecular sense due to steric and geometric factors and can be provided by the same functionalities described for D. Preferred examples of B are nitrogen, oxygen, or sulfur heterocycles. The arrows from B to $M^{n+}$ are used to represent bonds resulting from intermolecular interactions.

The schematic representation shown in FIG. 1 does not imply that donor groups are connected, not does it imply the identities of the metal ion, donor groups, chelating ligand, and peripheral substituents. For example, the invention is not restricted to macrocycles containing bridges as protecting groups, and may include ligands attached at a single point (pillared ligands). In typical compositions that are the subject of this invention, four donors derived from a chelating ligand coordinate intramolecularly to the metal ion. At least one other donor is provided at the ligand periphery that is capable of serving intermolecularly to form solids with a substantial proportion of five coordinate deoxy TEC sites. Ligand substituents serve to control or modify packing of TEC units to prevent blockage of oxygen interaction sites and inhibit μ-peroxo dimer formation.

The general classes of TECs that are included in this invention are based on chelating ligands including macrocycles and acyclic multidentate systems such as porphyrins, cyclidenes, Schiff bases (including Schiff base derivatives of either 3-, or 2-aroyl-1,3-dicarbonyl systems), polyoxoamines, and polyamines. In some cases, conversion of the chelating ligand to the TEC may require deprotonation. For example, bis(Schiff base) adducts formed between salicylaldehydes and diamines function as dianions when combined with a divalent metal ion such as cobalt(II). TECs are included that are either symmetrical or non-symmetrical with respect to the primary coordination environment and the peripheral substituents. For example, bis(Schiff base) systems based on diamines can be formed using two different carbonyl components. A secondary source of asymmetry for TECs derived from bis(Schiff base) adducts lies in the diamine component itself. For example, TECs derived from 3,4-diaminopyridine (abbreviated as DAP) are inherently non-symmetrical.

One embodiment of the invention uses TECs having ligands with a primary tetradentate donor set that binds intramolecularly to the metal center and with one or more sites available for intermolecular donation from another discrete TEC. These intermolecular sites are incapable of intramolecular donation due to geometric and steric constraints. Substituents are provided on the ligand periphery to ensure that oxygen interaction sites are maintained in the solid state and that μ-peroxo binding modes are inhibited.

TECs having ligands with substituents to control or modify TEC packing and create vacant oxygen interaction sites, but that lack extensive superstructure, such as "bridges" or "caps", are particularly preferred both for synthetic ease and to keep molecular weights below about 700 Daltons.

For non-symmetrical ligands, two cases are contemplated: (1) where the ligand is a single component with unique composition, and (2) where a mixture of ligands is utilized that includes symmetrical and nonsymmetrical components. The latter category include examples where, for example, a Schiff base condensation is performed using a diamine and a mixture of two carbonyl components. If reaction rates for the carbonyl components are comparable, then a statistical distribution of compositions is expected. The use of TEC mixtures may be beneficial to suppress highly crystalline phases and to increase the TEC content of a solid by reducing the effective molecular weight. For example, all specified features with respect to the current invention may be found in a TEC derived from a ligand mixture prepared by the Schiff base condensation between 3,4-diaminopyridine and a mixture of 3-tert-butylsalicylaldehyde and 3,5-di-tert-butylsalicylaldehyde. This mixture is not required to be equimolar.

In another embodiment, a deliberate mixture of TECs, formed independently, is used for sorbent formation from solution. The TEC components may contain different numbers of donors capable of serving in an intermolecular manner, but which combine so that the resulting solid contains a high proportion of five coordinate deoxy TEC sites by virtue of coordination preference, statistics, and packing in the solid state.

Preferred TEC families that incorporate the features described above are illustrated in FIG. 2. Substituents that are most preferred are summarized in Table 1 for structures shown in FIG. 2. Compositions designated 1(a)–1(c) in the Table possess structure (1) in FIG. 2. The composition designated 2 in the Table possesses structure 2 in FIG. 2. Compositions designated 3(a)–3(c) in the Table possess structure (3) in FIG. 2. With respect to structure 3, note that if Y is non-symmetrical, there will be two isomers.

The combinations of substituents are selected so as to minimize known decomposition pathways and to tailor the oxygen binding characteristics for a particular application (e.g. fluid separation or purification). Some allowance is required for cooperative effects where oxygenation at TEC sites affect the equilibria for oxygenation at neighboring sites. This behavior is believed to have occurred for the composition Co(3,5-di-tert-BusalDAP).

TABLE 1

| Composition | $R^1$ | $R^2$ | $R^3$ | $R^4$ | $R^5$ | $R^6$ | $R^7$ | $R^8$ | $R^9$ | $R^{10}$ | Y |
|---|---|---|---|---|---|---|---|---|---|---|---|
| (1a) | a | b | c | a | b | c | — | — | — | — | f |
| (1b) | h | b | c | h | b | c | — | — | — | — | g |
| (1c) | a | i | c | a | i | c | — | — | — | — | g |
| (2) | d | e | e | e | c | d | e | e | e | c | f |
| (3a) | a | b | c | e | e | e | e | c | — | — | f |
| (3b) | h | b | c | e | e | e | e | c | — | — | g |
| (3c) | a | i | c | e | e | e | e | c | — | — | g |

"a" represents -alkyl, perfluoroalkyl, -aryl, -O-alkyl, -N-dialkyl
"b" represents -acyl (-CO-alkyl), -aroyl (-CO-aryl), -carboxyalkyl (—$CO_2$-alkyl), —H, —CN, -halogen, —$NO_2$, imido, dialkyl carboxamido (CO-N-dialkyl)
"c" represents —H, -alkyl, -aryl
"d" represents -alkyl, -halogen, -O-alkyl, —$NO_2$, -carboxyalkyl (-$CO_2$-alkyl)
"e" represents —H, -alkyl, -halogen, -O-alkyl, —$NO_2$, -carboxyalkyl (-$CO_2$-alkyl)
"f" represents 3,4-disubstituted pyridine, 4,5-disubstituted pyrimidine, 3-substituted-4-(substituted-methyl) pyridine
"g" represents —$(CH_2)_2$—, —$(CH_2)_3$—, —$CH_2CMe_2CH_2$—, —$(CMe_2)_2$—, —$CMe_2CH_2$—, —$C_6H_4$—, —$C_6H_{10}$-isomers and mixtures
"h" represents -pyridyl, pyrimidinyl, -pyrazinyl, quinolinyl
"i" represents -CO-pyridyl, -CO-imidazoyl, —CN The variable substituents ($R^1$ through $R^{10}$, and Y) are based on structural fragments that are known or synthetically accessible by reasonable extension of existing knowledge. The substituents are independently variable within each composition specified by row in Table 1.

The TEC sorbents of the invention may be prepared in a solid form by metallation of the ligand or ligand precursors using methods known to those skilled in the art. This process includes:

a) providing chelating ligand or ligands that provide the following features:
   i) said chelating ligand or ligands provides up to four intramolecular donor sites to said transition element ion;
   ii) said chelating ligand or ligands provides an intermolecular donor site to a second transition element ion which is contained in second discrete transition element complex; and
   iii) said chelating ligand or ligands contains at least one substituent that inhibits μ-peroxo dimer formation on said sorbent; precursors to the above noted chelating ligand or ligands may also be used.

b) combining said ligands or ligand precursors with an appropriate metal salt in solution so as to form a transition element complex in a suitable solvent and base (if required). Examples of solvents include alcohols, ketones, esters, nitrites, ethers, and dipolar aprotic solvents that provide at least partial solubility to the reagents. Examples of bases include inorganic hydroxides, oxides, or carbonates, or organic bases including alkylamines and heteroaromatics. The base is required to neutralize any acidic biproducts from the metallation reaction through salt formation. and c) isolating solid said transition element complex by at least one of filtration, concentration, precipitation such that said complex is recovered in the solid state.

In addition to improving and optimizing yields of synthetic transformations to reduce sorbent cost, sorbent purity is important to material performance. In addition, the solid formation process from solution effects sorbent performance by controlling packing, crystallinity, and porosity in the bulk solid which are necessary for fast rates. Controlled neutralization, aging of intermediate solutions, controlled evaporation, crystallization (including at subambient temperatures), freeze-drying, supercritical drying, and precipitation are contemplated as preparation methods which optimize material performance, particularly with respect to formation of solid TEC. Supercritical drying is preferable for examples where forces associated with conventional solvent removal processes may destroy the solid-state structure.

Although the materials described in this invention incorporate groups capable of intermolecular coordination, the introduction of exogenous donors at less than stoichiometric amounts may be desirable either to increase the proportion of TECs existing in a five coordinate state, or to disrupt the TEC packing to give reduced framework dimensions. This may be necessary to reduce or modify cooperative effects. In addition, the use of a small proportion of exogenous donor may serve as an interface for supported forms.

Although the compositions described herein are self-supported TEC sorbents, there are circumstances where it may be desirable to disperse them on supports. For example, supported forms may reduce the impact of cooperative binding effects, reduce critical dimensions of TEC crystallites, facilitate diffusional processes, serve to distribute heat associated with adsorption and desorption, and facilitate the fabrication of structured forms such as pellets or beads that may be desirable for commercial applications. The content of support material should be kept to the minimum required to address properties outlined above since the presence of a support will diminish equilibrium oxygen loadings achievable relative to a non-supported form.

Figure 2:
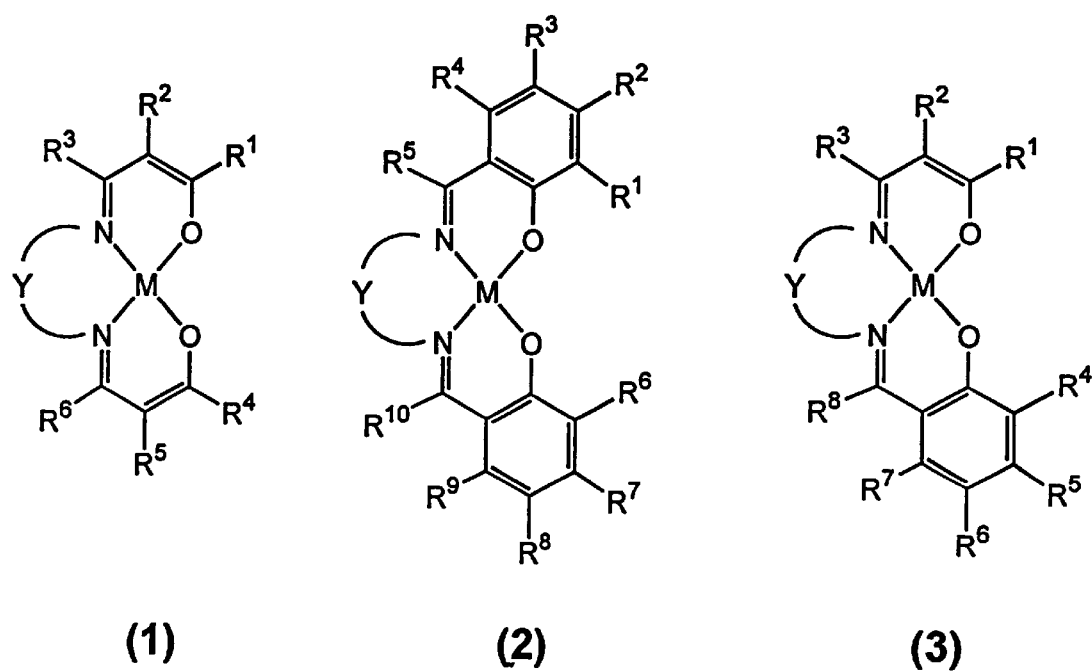
FIG. 2 shows three specific embodiments of the invention.

The current invention was reduced to practice in a specific example designated Co(3,5-di-tert-BusalDAP). This example is shown in FIG. 2, structure (2), wherein $R^1=R^3=R^6=R^8$=tert-Butyl; $R^2=R^4=R^5=R^7=R^9=R^{10}$=H; Y=3,4-disubstituted pyridine and M=cobalt(II)).

Preparation of the TEC precursor was performed in ethanol using two equivalents of 3,5-di-tert-butylsalicylaldehyde and one equivalent of 3,4-diaminopyridine (DAP). A yellow solid was isolated from aqueous ethanol consistent with a 1:1 mixture of 3,5-di-tert-butylsalicylaldehyde and its mono-imine with 3,4-diaminopyridine. It is believed that closure to the chelate occurs during the metallation step. Several alternative preparation and isolation procedures have been examined to convert the TEC precursor to Co(3,5-di-tert-BusalDAP) under inert atmosphere conditions. The preparation that resulted in a solid exhibiting the best performance, with respect to oxygen loadings and selectivities, used cobalt(II) acetate and sodium hydroxide in ethanol followed by solvent removal. The isolated solid produced using this procedure contained sodium acetate as an impurity. Optical microscopy indicated that sodium acetate and the TEC crystallize separately. Details of syntheses and performance are described in the following section.

Single component isotherms were determined gravimetrically using both oxygen and nitrogen as adsorbates. Data were corrected for buoyancy effects. Data reported at each pressure setpoint represent averages of values obtained for approaches from both low and high pressure, with the exception of the highest pressure indicated which was approached from low pressure only. Sorption data for oxygen and nitrogen using Co(3,5-di-tert-BusalDAP) samples at temperatures near ambient indicate a combination of high oxygen loadings, selectivity for oxygen over nitrogen, fast rates, and good reversibility.

Additional studies were performed for a material designated Co{3,5-di-tert-Busal/(EtO)($CO_2$Et)Hmal-DAP} which was prepared by first condensing 3,4-diaminopyridine with one equivalent of diethyl ethoxymethylenemalonate, treatment of the product with a cobalt salt (e.g. cobalt acetate) and one equivalent of 3,5-di-tert-butylsalicylaldehyde to form a non-symmetrical bis(Schiff base) and simultaneously metallate the system, followed by neutralization with two equivalents of base (e.g. sodium hydroxide). The product is believed to correspond to structure (3) in FIG. 2, where $R^1$=EtO, $R^2=CO_2$Et, $R^3$=H, $R^4=R^6$=tert-butyl, $R^5=R^7=R^8$=H, Y=3,4-disubstituted pyridine. Based on known chemistries and preparative route, a single isomer is anticipated where the 3-amino substituent of the 3,4-diaminopyridine participates in the initial condensation reaction. Sorption studies reveal an increased contribution of TEC sites at low pressures relative to Co(3,5-di-tert-BusalDAP).

EXAMPLES

Preparation and Testing of Co(3,5-di-tert-BusalDAP)

Example 1

Preparation of a TEC Precursor

The TEC precursor was prepared by adding a solution of 3,4-diaminopyridine (1.017 g, 9.32 mmol) in warm ethanol (25 ml) to a mixture of 3,5-di-tert-butylsalicylaldehyde (4.278 g, 18.3 mmol) in ethanol (25 ml). The mixture was heated for 15 minutes then allowed to cool giving a deep yellow solution. A yellow solid was obtained by addition of water to a solution in hot ethanol until the solution began to turn cloudy, cooling, collection by filtration, and drying in air. The mass of solid obtained was 4.66 g. The composition of the isolated solid is consistent with a 1:1 mixture of 3,5-di-tert-butylsalicylaldehyde and its mono-imine with 3,4-diaminopyridine based on $^1$H NMR spectroscopy. This material was used in the preparation of the cobalt(II) complex.

Preparation of Co(3,5-di-tert-BusalDAP)

Methanol (50 ml) was added to a mixture of the TEC precursor described above (1.973 g) and cobalt(II) acetate hydrate (0.923 g, 3.71 mmol) within an inert atmosphere glove box. This yielded in a dark solution containing solid. A solution of sodium hydroxide (0.295 g, 7.38 mmol) in methanol (20 ml) was added, then the system was heated for 10 minutes. On cooling, the solvent was removed under reduced pressure to yield a dark solid. This material was designated Co(3,5-di-tert-BusalDAP) since it was believed that closure to the chelate occurs during the metallation step. Because of the preparative method employed, this sample contained sodium acetate as an impurity. However, microscopy indicates that sodium acetate and the TEC crystallize separately.

Nitrogen sorption at 77 K following activation at 50° C. for 24 hours indicated a specific surface area of 223 m²/g (BET method) with the majority of porosity residing in micropores (T-plot). Infrared spectroscopy (KBr pellet) showed intense signals at 1515 and 1575 cm$^{-1}$ with a shoulder at 1610 cm$^{-1}$. No NH or OH signals were observed supporting the proposed condensation under metallation conditions to give the bis(Schiff base).

Oxygenation of Co(3,5-di-tert-BusalDAP) in Solution

Figure 3:
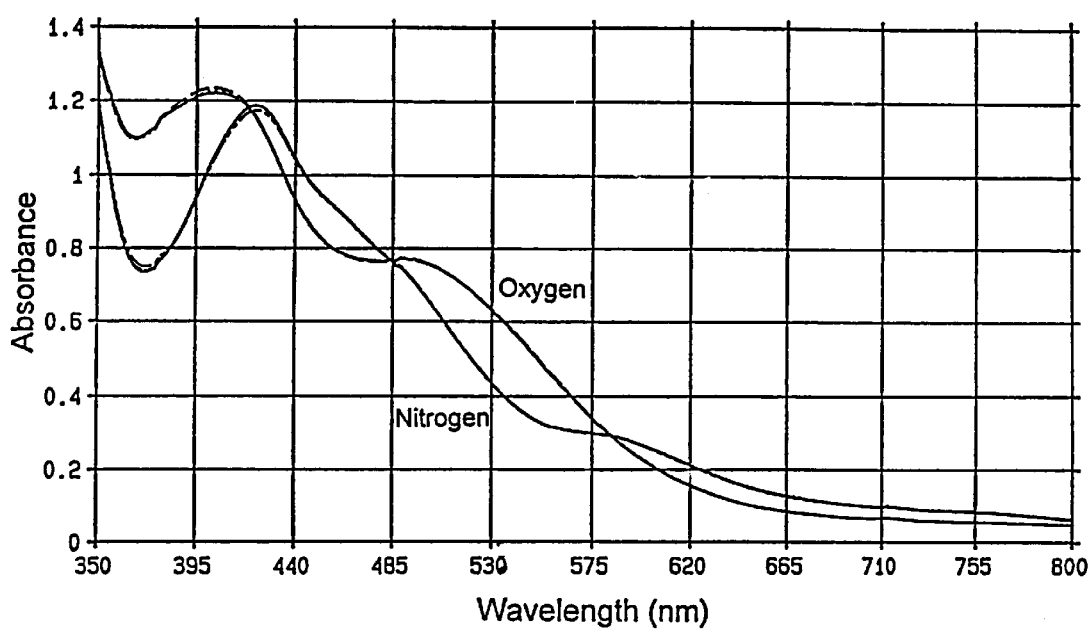
FIG. 3 shows reversible oxygenation of Co(3,5-di-tert-BusalDAP) in toluene containing pyridine.

The ability of Co(3,5-di-tert-BusalDAP) to undergo reversible oxygenation was demonstrated in dilute solution containing pyridine (11.1 M). The exogenous base was required to provide five-coordinate deoxy TEC sites since, based on typical values of base binding constants, intermolecular coordination was not expected to occur at low TEC concentrations. Cycling between nitrogen and oxygen bubbling through the solution resulted in the reversible spectroscopic change illustrated in FIG. 3 (three cycles shown).

Sorption Studies for Co(3,5-di-tert-BusalDAP)

A critical aspect to the practical application of oxygen selective sorbents is the amount of oxygen that can be taken up under fixed conditions of temperature and pressure. This value can be expressed either in moles of oxygen per kilogram of solid (loading) or moles of oxygen per liter of solid (storage).

Figure 4:
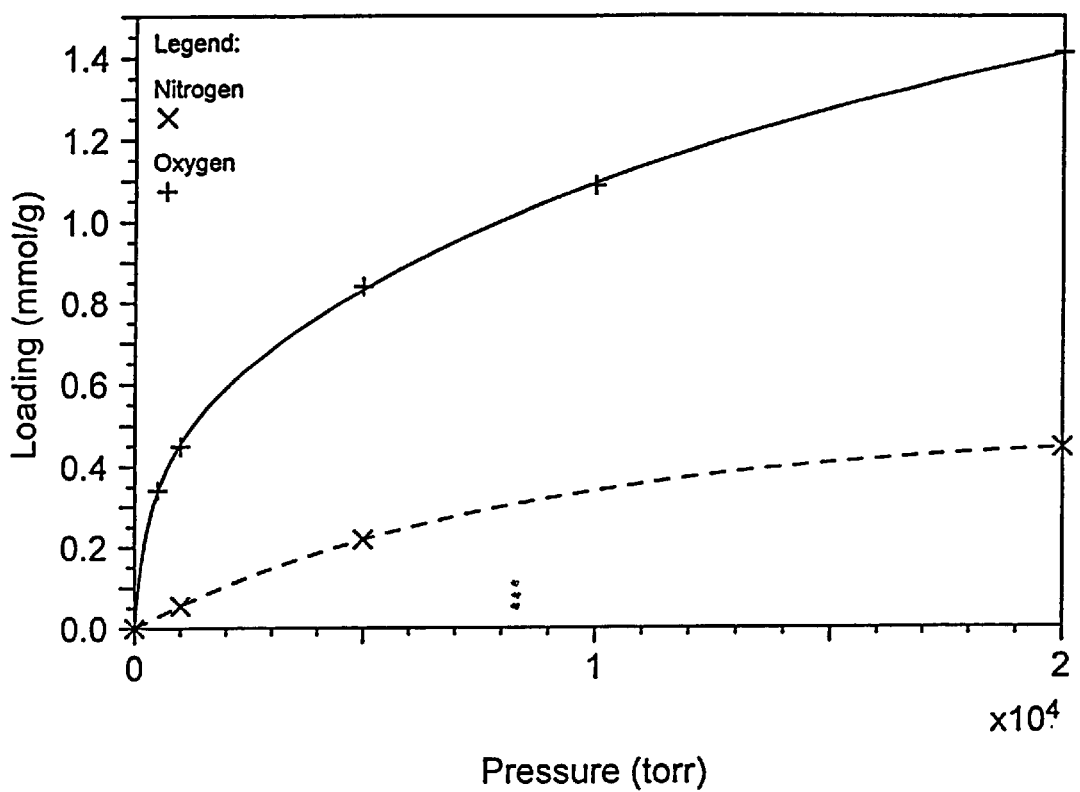
FIG. 4 shows oxygen and nitrogen isotherms for Example 1 at 0° C.
Figure 5:
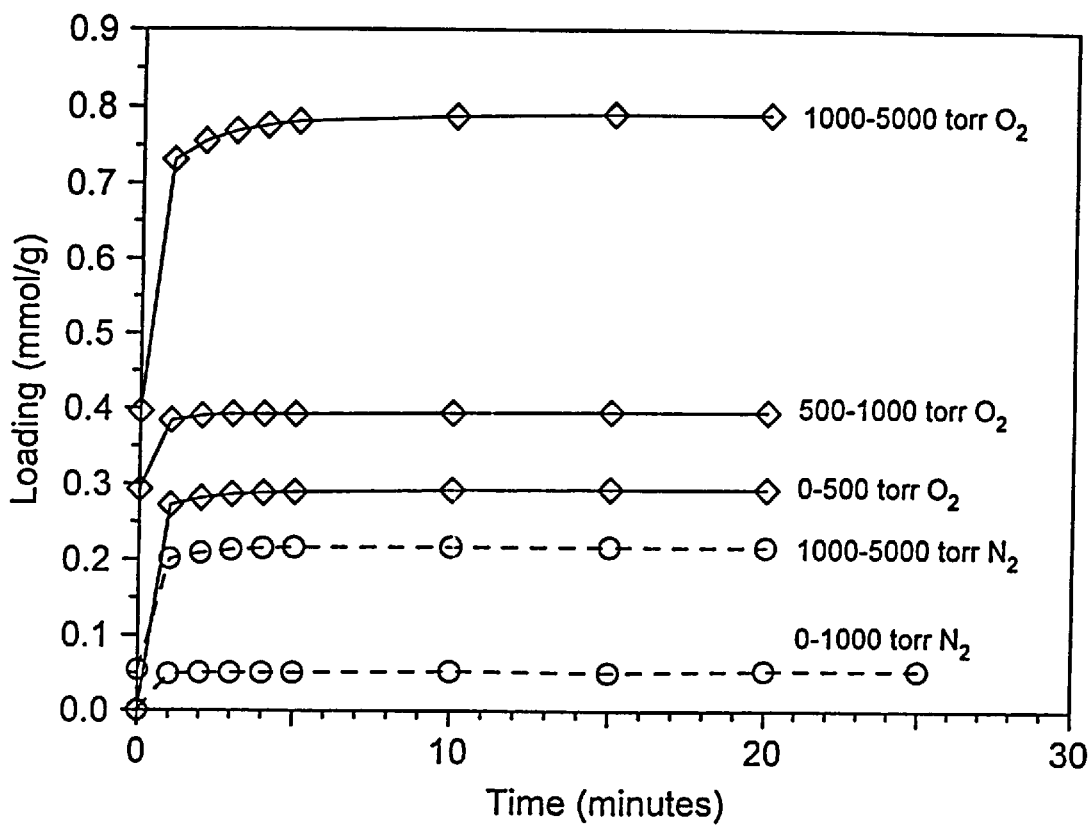
FIG. 5 shows oxygen uptake rates for Example 1 at 0° C.

Sorption studies were performed gravimetrically on a pressure microbalance using oxygen, nitrogen and argon as adsorbates. Average equilibrium data at 0° C. for the sample designated "Example 1" are presented in FIG. 4 and at rate data at 0° C. for typical steps are presented in FIG. 5. Numerical data for the Co(3,5-di-tert-BusalDAP) sample designated "Example 1" at 27 and 0° C. are presented in Tables 1 and 2, respectively. A comparison of solution and solid state data strongly suggest that the oxygen interaction in the solid state includes a cooperative effect where oxygenation at one TEC sites decreases the affinity for adjacent sites, presumably by transmission of electronic effects via the axial donor.

TABLE 2

Sorption for Example 1 at 27° C.

| Pressure (torr) | Oxygen Loading (mole/kg) | Nitrogen Loading (mole/kg) | Argon Loading (mole/kg) |
|---|---|---|---|
| 0 | 0 | 0 | 0 |
| 500 | 0.161 | — | — |
| 1000 | 0.242 | 0.046 | 0.063 |
| 3779 | 0.501 | 0.146 | 0/187 |
| 5000 | 0.574 | 0.182 | 0.23 |

TABLE 3

Sorption for Example 1 at 27° C.

| Pressure (torr) | Oxygen Loading (mole/kg) | Nitrogen Loading (mole/kg) |
|---|---|---|
| 0 | 0 | 0 |
| 500 | 0.341 | — |
| 1000 | 0.449 | 0.055 |
| 5000 | 0.840 | 0.218 |
| 10000 | 1.087 | — |
| 20000 | 1.412 | 0.443 |

Example 2

Purification of Co(3,5-di-tert-BusalDAP)

A sample of Co(3,5-di-tert-BusalDAP) prepared according to the method described in Example 1 and containing sodium acetate was purified by crystallization from toluene within an inert atmosphere enclosure. A sample of the crude material was heated in toluene, filtered hot, then allowed to cool slowly to room temperature. During cooling, a fibrous network of fine crystals was obtained. The solid was collected by vacuum filtration. This sample of Co(3,5-di-tert-BusalDAP) is designated "Example 2".

Subsequent experiments involving heating at 50° C. under vacuum reveal that the isolated solid contains a 25.5 wt. % volatile component believed to be toluene.

Sorption Studies for Co(3,5-di-tert-BusalDAP)—"Example 2"

Average equilibrium data for the Co(3,5-di-tert-BusalDAP) sample designated "Example 2" are presented in Tables 3 and 4. These data were obtained using methods described in preceding paragraphs related to "Example 1". Performance of the Co(3,5-di-tert-BusalDAP) sample designated "Example 2" is inferior to that observed for "Example 1" based on oxygen loadings and selectivities.

TABLE 4

Sorption for Example 2 at 27° C.

| Pressure (torr) | Oxygen Loading (mole/kg) | Nitrogen Loading (mole/kg) |
|---|---|---|
| 0 | 0 | 0 |
| 1000 | 0.133 | — |
| 2000 | — | 0.027 |
| 5000 | 0.283 | — |
| 10000 | 0.397 | 0.105 |
| 20000 | 0.569 | 0.166 |

TABLE 5

Sorption for Example 2 at 0° C.

| Pressure (torr) | Oxygen Loading (mole/kg) | Nitrogen Loading (mole/kg) |
|---|---|---|
| 0 | 0 | 0 |
| 1000 | 0.490 | — |
| 2000 | — | 0.233 |
| 5000 | 1.122 | — |
| 10000 | 1.583 | 0.799 |
| 15000 | 1.870 | — |
| 20000 | 2.041 | 1.090 |

Example 3
Alternative Preparation of Co(3,5-di-tert-BusalDAP)

An alternative preparation of Co(3,5-di-tert-BusalDAP) was performed by metallation of the precursor described in Example 1, but using triethylamine rather than sodium hydroxide as base. A mixture of the TEC precursor described in "Example 1" (2.00 g, 3.57 mmol) was dissolved in methanol (50 ml) then the mixture was filtered to give a yellow solution. Triethylamine (1.0 ml) was added followed by a solution of cobalt(II) acetate hydrate (0.8899 g, 3.57 mmol) in methanol (20 ml). A dark brown solution formed containing solid. The mixture was heated at reflux for 40 minutes then left to cool. The dark solid was collected by filtration then dried under vacuum. The mass of solid obtained was 0.8631 g.

Sorption Studies for Co(3,5-di-tert-BusalDAP), "Example 3"

Average equilibrium data for the Co(3,5-di-tert-BusalDAP) sample designated "Example 3" at 0 and −23° C. are presented in Tables 6 and 7, respectively. These data were obtained using methods described in preceding paragraphs related to "Example 1". Performance of the Co(3,5-di-tert-BusalDAP) sample designated "Example 3" is inferior to that observed for "Example 1" based on oxygen selectivities.

TABLE 6

Sorption for Example 3 at 0° C.

| Pressure (torr) | Oxygen Loading (mole/kg) | Nitrogen Loading (mole/kg) |
|---|---|---|
| 0 | 0 | 0 |
| 1000 | 0.307 | — |
| 2000 | — | 0.166 |
| 5000 | 0.790 | — |
| 10000 | 1.161 | 0.590 |
| 15000 | 1.424 | |
| 20000 | 1.614 | 0.879 |

TABLE 7

Sorption for Example 3 at −23° C.

| Pressure (torr) | Oxygen Loading (mole/kg) | Nitrogen Loading (mole/kg) |
|---|---|---|
| 0 | 0 | 0 |
| 1000 | 0.490 | — |
| 2000 | — | 0.233 |
| 5000 | 1.122 | — |
| 10000 | 1.161 | 0.590 |
| 15000 | 1.424 | |
| 20000 | 1.614 | 0.879 |

Preparation and Testing of Co{3,5-di-tert-Busal/(EtO)(CO₂Et)Hmal-DAP}

Example 4
Preparation of a TEC Precursor

The 1:1 Schiff base adduct between 3,4-diaminopyridine and diethyl ethoxymethylenemalonate was prepared as follows: A solution of diethyl ethoxymethylene malonate (10.03 g, 46.4 mmol) in ethanol (50 ml) was added to a hot solution of 3,4-diaminopyridine (5.06 g, 46.4 mmol) in ethanol (200 ml) over 2 minutes. The mixture was heated at boiling for 30 minutes, filtered hot, then allowed to cool. It was refrigerated overnight, then the resulting off-white solid was isolation by filtration, rinsed with cold ethanol (50 ml) and dried. Mass obtained 7.92 g.

Preparation of Co{3,5-di-tert-Busal/(EtO)(CO₂Et)Hmal-DAP}

The 1:1 Schiff base adduct between 3,4-diaminopyridine 0.500 g, 1.79 mmol)(preparation described above), 3,5-di-tert-butylsalicylaldehyde (0.4195 g, 1.79 mmol), cobalt(II) acetate tetrahydrate (0.4458 g, 1.79 mmol), and sodium hydroxide (0.1432 g, 3.58 mmol) were transferred to a glove box by standard procedures. Synthesis, isolation, and handling of the oxygen selective sorbent were performed within the glove box. Ethanol (30 ml) was added separately to a mixture of cobalt(II) acetate and 3,5-di-tert-butylsalicylaldehyde, and the 1:1 Schiff base adduct described above. Each solution was stirred at low heat for 1 hr. The solution of 1:1 Schiff base adduct was added to the other solution, then the mixture was stirred for an additional hour at low heat. Sodium hydroxide in ethanol (10 ml) was added, then the mixture was allowed to stir at room temperature for 4 days. The resulting black solid was collected by filtration and dried under vacuum. Mass obtained, 0.7635 g.

Sorption Studies for Co{3,5-di-tert-Busal/(EtO)(CO₂Et)Hmal-DAP} "Example 4"

Average equilibrium data for the Co(3,5-di-tert-Busal/(EtO)(CO₂Et)Hmal-DAP) sample designated "Example 4" at 0° C. are presented in Table 8. These data were obtained using methods described in preceding paragraphs related to "Example 1". Performance of the sample designated Co(3,5-di-tert-Busal/(EtO)(CO₂Et)Hmal-DAP) is superior to that observed for the Co(3,5-di-tert-BusalDAP) sample designated "Example 1" based on oxygen loadings at lowered pressures and selectivities. In addition, the oxygen isotherm shape is more suited to many applications since the TEC sites in Co(3,5-di-tert-Busal/(EtO)(CO₂Et)Hmal-DAP) ("Example 4") contribute at significantly lower pressures relative to Co(3,5-di-tert-BusalDAP)("Example 1").

TABLE 8

Sorption for Example 4 at 0° C.

| Pressure (torr) | Oxygen Loading (mole/kg) | Nitrogen Loading (mole/kg) |
|---|---|---|
| 0 | 0 | 0 |
| 1000 | 1.069 | — |
| 2000 | — | 0.142 |
| 5000 | 1.55 | — |
| 10000 | 1.823 | 0.517 |
| 20000 | 2.111 | 0.714 |

Alternative Preparation of Co{3,5-di-tert-Busal/(EtO)(CO₂Et)Hmal-DAP}

Example 5

The 1:1 Schiff base adduct between 3,4-diaminopyridine 0.500 g, 1.79 mmole)(preparation described above), 3,5-di-tert-butylsalicylaldehyde (0.4206 g, 1.80 mmole), cobalt(II) acetate tetrahydrate (0.4458 g, 1.79 mmole), and sodium hydroxide (0.1515 g, 3.79 mmol were transferred to a glove box by standard procedures. Synthesis, isolation, and handling of the oxygen selective sorbent were performed within the glove box. Ethanol (50 ml) was added to a mixture of the 1:1 Schiff base adduct, 3,5-di-tert-butylsalicylaldehyde, and cobalt(II) acetate then the mixture was stirred at room temperature for 30 minutes to give a red-brown homogeneous solution. A solution of sodium hydroxide in ethanol (20 ml) was prepared, then approximately ⅔ of this solution was added dropwise over 10 minutes to the red-brown solution. After standing for 5 minutes, the remaining sodium hydroxide solution was added dropwise. A dark brown solid formed over several hours. After standing for 18 hr, the solid was collected by filtration and dried under vacuum. Mass obtained 0.9428 g.

Sorption Studies for Co{3,5-di-tert-Busal/(EtO)(CO$_2$Et) Hmal-DAP}

Example 5

Average equilibrium data for the Co(3,5-di-tert-Busal/ (EtO)(CO$_2$Et)Hmal-DAP) sample designated "Example 5" at 0° C. are presented in Table 9. These data were obtained using methods described in preceding paragraphs related to "Example 1". Performance of the sample designated Co(3, 5-di-tert-Busal/(EtO)(CO$_2$Et)Hmal-DAP) and denoted "Example 5" is superior to that observed for the Co(3,5-di-tert-BusalDAP) sample designated "Example 1" and similar to that observed for the Co(3,5-di-tert-Busal/(EtO)(CO$_2$Et) Hmal-DAP) sample denoted "Example 4" based on oxygen loadings at low pressure and selectivities.

TABLE 8

Sorption for Example 5 at 0° C.

| Pressure (torr) | Oxygen Loading (mole/kg) | Nitrogen Loading (mole/kg) |
| --- | --- | --- |
| 0 | 0 | 0 |
| 1000 | 1.125 | — |
| 2000 | — | 0.116 |
| 5000 | 1.55 | — |
| 10000 | 1.743 | 0.398 |
| 20000 | 1.904 | 0.533 |

The sorbents of the present invention may be used in separations or enrichments of fluid mixtures containing oxygen. For example, processes based on oxygen selective sorbents would allow air separation to produce either nitrogen or oxygen or both. In addition, the materials of the present invention may be used in the enrichment of air with either nitrogen or oxygen. In another embodiment, an oxygen selective sorbent could be employed for oxygen removal from other fluids including mixtures with nitrogen and argon, where oxygen is a minor or trace component.

Oxygen selective sorbents of the invention may also be utilized for catalytic applications, particularly oxygen activation for the partial oxidation or selective oxidation of organic substrates. The sorbents of the invention may also be used to separate CO from mixtures of other fluids including CO.

Specific features of the invention are shown in one or more of the drawings for convenience only, as each feature may be combined with other features in accordance with the invention. Alternative embodiments will be recognized by those skilled in the art and are intended to be within the scope of the claims.

What is claimed is:

1. A process for selectively adsorbing oxygen from a gas mixture containing oxygen which comprises contacting said gas mixture with a solid state oxygen selective material comprising at least one discrete solid state transition element complex, each said transition element complex comprising:

a first transition element ion and one or more chelating ligands, wherein:

i) said first transition element ion is capable of accepting intermolecular electron donation from a chelating ligand on a second discrete transition element complex;

ii) said chelating ligand or ligands provides one to four electron donor sites To said transition element ion;

iii) said chelating ligand or ligands provides an intermolecular electron donor site to said second transition element ion which is contained in said second discrete transition element complex; and iv) said chelating ligand or ligands contains at least one substituent that inhibits $\mu$-peroxo dimer formation on said material;

wherein when said material is in deoxy form, the total number of electron donor sites to said first transition element ion is five.

2. The process of claim 1, wherein said transition metal ion is selected from the group consisting of cobalt(II), iron(II), nickel(II), manganese(II), ruthenium(II), ruthenium (III), copper(I) and rhodium(III).

3. The process of claim 2, wherein said transition metal ion is selected from the group consisting of cobalt(II), iron(II), nickel(II) and copper(I).

4. The process of claim 1, wherein said complex has one ligand, and wherein said ligand is pentadentate in the solid state.

5. The process of claim 1, wherein said ligand or ligands provides four intramolecular donor sites to said transition element ion.

6. The process of claim 5, wherein a fifth donor to said transition element ion is provided from an intermolecular monodentate ligand from another discrete complex.

7. The process of claim 1, wherein the intermolecular donor sites from said chelating ligand or ligands are selected from at least one of nitrogen, oxygen and sulfur.

8. The process of claim 1, wherein the donor sites from said ligand or ligands are provided from functional groups selected from the group consisting of amines, amides, imides, imines, aldehydes, ketones, esters, acids, $\beta$-ketoimines, phenolates, alcohols, ethers, thiols, thioethers, thioesters, thioamides and combinations thereof.

9. The process of claim 1, wherein said ligand (i) is a bis(Schiff base) ligand containing an $N_2O_2$ donor set.

10. The process of claim 1, wherein the intermolecular donor sites from said chelating ligand or ligands are selected from at least one of nitrogen, oxygen and sulfur.

11. The process of claim 1, wherein the donor site from said intermolecular chelating ligand (ii) is a nitrogen heterocycle.

12. The process of claim 1, wherein the donor sites from said chelating ligands (i) and (ii) are provided from functional groups selected from the group consisting of amines, amides, imides, imines, aldehydes, ketones, esters, acids, $\beta$-ketoimines, phenolates, alcohols, ethers, heterocycles, thiols, thioethers, thioesters, thioamides and combinations thereof.

13. The process of claim 1, wherein said at least one substituent is selected from the group consisting of alkyl, aryl, O-alkyl, O-aryl, acyl, aroyl, alkyl or aryl esters, alkylamides, halogens, nitro, and nitrile.

14. The process of claim 13, wherein said at least one substituent is one of tert-butyl, acetyl, aroyl, or alkylesters.

15. The process of claim 1, wherein said complex has a molecular weight below about 700 Daltons.

16. The process of claim 1, wherein said oxygen selective material is self-supporting.

17. The process of claim 1, wherein said oxygen selective material is deposited on a substrate.

* * * * *